United States Patent
Wright

(10) Patent No.: US 6,985,786 B2
(45) Date of Patent: Jan. 10, 2006

(54) METHOD FOR MANAGING MANUFACTURING DATA

(75) Inventor: Jason Richard Wright, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1155 days.

(21) Appl. No.: 09/842,598

(22) Filed: Apr. 25, 2001

(65) Prior Publication Data

US 2002/0183881 A1    Dec. 5, 2002

(51) Int. Cl.
    *G06F 19/00*    (2006.01)

(52) U.S. Cl. .......................... 700/115; 700/65; 700/95; 700/109

(58) Field of Classification Search .................. 700/65, 700/90, 95, 97, 109, 115–117
See application file for complete search history.

(56) References Cited

U.S. PATENT DOCUMENTS

| | | | | |
|---|---|---|---|---|
| 5,307,456 A | * | 4/1994 | MacKay | 715/782 |
| 5,347,463 A | * | 9/1994 | Nakamura et al. | 700/226 |
| 5,717,595 A | * | 2/1998 | Cherrington et al. | 705/400 |
| 6,397,190 B1 | * | 5/2002 | Goetz | 705/3 |
| 6,606,744 B1 | * | 8/2003 | Mikurak | 717/174 |
| 6,738,697 B2 | * | 5/2004 | Breed | 701/29 |
| 6,847,854 B2 | * | 1/2005 | Discenzo | 700/99 |

* cited by examiner

Primary Examiner—Jayprakash N. Gandhi

(57) ABSTRACT

A method for building a product tracking data history has steps that include installing a remotely operable diagnostic tool on the product which may be remotely operated during the product manufacture process to report certain product specification data. The method also has steps of placing product assembly specifications and performance testing protocols on a central data repository for remote access by the product assembler, thereby reducing data transfer associated costs and efforts and eliminating uncertainties regarding which assembly specifications and performance test protocols are being used by an assembler.

30 Claims, 3 Drawing Sheets

METHOD FOR MANAGING MANUFACTURING DATA

FIELD OF THE INVENTION

The present invention relates to methods for managing manufacturing systems. In particular, the present invention relates to methods for managing information flow along a manufacturing supply chain regarding product specifications.

BACKGROUND OF THE INVENTION

In order to provide an acceptable level of quality for commercial products, a product tracking data history for the product needs to be built during the manufacture process. Generally, this data history provides a list of which components were installed in the product, when they were installed, and how they were installed. The product tracking data history may further include a history of performance tests done on the product as well as any product defects that have been discovered.

Current manufacturing practices for large companies often involve the manufacture of a product by a manufacturing group that is far removed from the product designers. A plurality of component parts may be obtained from outside vendors that are then assembled to build the product. Under these circumstances it is difficult to build an accurate product tracking data history due to the many layers of organizational separation that exist within the company between the product designer, or "owner", and the ultimate assembler.

This problem is even more acute in so called "contract manufacturing" situations, where a product is manufactured for a product owner by an external contractor. These situations have become popular in industry as they allow the product owner to focus on product research, development, and marketing. As an example, a computer peripheral manufacturer may research and design products, and then contract out the manufacture of those products.

In both cases of internal manufacturing and contract manufacturing, the process of manufacturing a product through purchase of commodity component parts which are then assembled together may generally be referred to as a "supply chain". In essence, each of the various component vendors and the assemblers, whether they are internal groups or external contractors, are a link in the supply chain. The final assembly link of the chain is critical, as it is here that the component parts are gathered together and the product is put in a final form. Because the product owner is removed from this final assembly link, the task of building an accurate product tracking data history is difficult.

At the final assembly link, the gathering of component parts and product assembly may occur under a "manufacturing execution system" ("MES"). The MES system generally coordinates product assembly by listing component parts required, times when they are required, places for the parts to be delivered, and specifications for assembling the product. The removed product owner or designer often depends completely on the contract assembler's MES to implement the owner's specifications, and to provide data for building a product tracking data history.

Relying on the assembly link MES in building a product tracking data history, however, has proven less than satisfactory, particularly for contract manufacturing situations. Generally, relying on the assembly link MES requires the accurate transfer of large amounts of data and know-how between the product owner and the assembly MES. These tasks add effort and cost to the product manufacture. Additionally, this is particularly difficult when the MES is within an external contractor.

Under these circumstances, the product owner must rely on the contractors to accurately transfer data. Errors may be introduced when, for example, a contractor reports that a certain product was built using a given specification or had particular performance testing results when in fact this data is in error. The possibility for these errors always exists when systems rely on external organizations to install methods and systems, to gather data, and to interpret and report data.

Partly in response to difficulties associated with relying on external organizations for obtaining and reporting tracking data, methods for building product data tracking histories have been proposed in which the product owner provides automated testing and documenting tools, often in the case of computer based tools. Often these tools are installed onto the contractors computer based MES system. In addition to providing assembly specifications, these tools may be able to be run by the contractor to document product components and to determine product performance. In theory they may lower the burden placed on the contractors, and in turn may improve accuracy of data transfer to the product owner.

In practice, however, such systems have proven less than satisfactory. These computer based tools may require a considerable degree of technical knowledge to install and operate, which translates to costly information technology support for the contractor. Additionally, assembly contractors and groups are typically staffed with relatively low skill operators who are not well suited for operating many of the computer based product history tools. After turning the tool over to the contractor, the product owner must rely on the contractor to insure that the tool is installed and being used correctly. Further, the tools have done little to alleviate the difficulties associated with transferring large amounts of data between owner and contractor. Finally, use of such computer based tools also introduces a new set of administrative problems in that the tools must be continuously updated and tracked to insure that each supply chain contractor is running the latest version of a particular tool.

Additional problems exist in building product data tracking histories related to detecting and resolving product defects. Even if the reliability of the individual components has been assured, they must still be properly installed to interface with one another. This is particularly true of technically sophisticated products such as computer peripherals. To insure proper interface, product owners may require performance testing at the assembly stage. The product owner provides specific testing protocols, which may change during the product lifespan as components change.

Often the test protocols are provided in the form of computer based tools, which the contractor must install and maintain. These must be regularly updated and documented as the protocols change. This again introduces technical support and administrative problems for the contractor and the product owner and adds cost to the manufacturing process. Additionally, in contract manufacturing situations, the product owner must again rely on an external organization to install, maintain, and accurately document testing protocols and results.

When performance testing detects a defect, the product may be sent to yet another contractor for defect resolution. This second contractor will need access to the product tracking data history to resolve the defect. The second contractor also needs to know what sorts of performance tests were run, and what defects those tests discovered. Providing all of this data to the second contractor requires time and effort from the product owner, thereby adding cost and delay to the manufacture process.

There are hence heretofore unresolved needs for methods for building product tracking data histories as a product is manufactured.

SUMMARY OF THE INVENTION

The present invention generally comprises an improved method for building a product tracking data history for a product of the type that has a processing means, with the method utilizing a communications network with a central computer device attached thereto. The method generally comprises the steps of installing a remotely operable diagnostic tool on the product, assigning a unique product identity code to the product, and connecting the product to the communications network during its manufacture so that the diagnostic tool may be remotely operated over the communications network to provide product specification data. A product tracking data history can then be built using the reported product specification data.

Preferably, the diagnostic tool comprises at least computer executable instructions recorded on a computer accessible medium, such as an integrated circuit chip. The recorded instructions are preferably capable of determining an inventory of components installed on the product, and of providing the unique product identity code.

In an additional embodiment of the improved method of the invention, operator computer devices that are used for at least a portion of the product manufacture are connected to the communications network. This embodiment further comprises steps of placing product assembly specifications on a central data repository connected to the central computer, which are transmitted from the central data repository to the operator computer devices for use during the product manufacture. The diagnostic tool reports back to the central computer device a unique identity code corresponding to the assembly specifications being used to assemble the product. This data is then included in the product tracking data history, so that an accurate and automatically reported record of what specifications were used to assemble the product is created.

In still an additional embodiment of the invention, product performance test protocols are placed on the central data repository. When the product is connected to the communications network during its manufacture, the diagnostic tool may be remotely operated over the network from the central computer to execute the test protocols and to report back to the central data repository an identity code for the protocol test performed as well as test results. This data is then included in the product tracking data history. Upon a FAIL result for any performance test, a product defect tracking history file may be created at the central data repository.

This embodiment of the improved method of the invention thereby results in accurate product testing without a requirement for expensive operator training or action. Additionally, accurate and automatically reported history of tests performed and test results are thereby reported. Finally, upon the occurrence of a test FAIL result, a centralized product defect history is started that may be conveniently accessed during the defect resolution process over the communications network by additional entities along the supply chain.

In a most preferred embodiment of the method of the invention, the product is being manufactured by at least an external contractor for the product owner. In this embodiment of the invention, the central computer device is under the control of the product owner, and each of the external contractors is connected to the communications network for interface with the central computer device. It will be appreciated that practice of this embodiment of the invention allows a product owner to keep accurate and tight control over the external manufacture of the product, as well as an accurate history of its manufacture.

All of the various embodiments of the method of building a product tracking history briefly described above thereby resolve several of the heretofore unresolved problems in the art. In general, the various embodiments of the methods of the invention advantageously remove layers of required interface and action in the product tracking data transfer process between the product owner and the product manufacturers. Depositing product assembly specifications and product testing protocols at a central data repository for remote access by contractors solves many problems associated with the transfer of this data. Installing a self diagnostic tool that is operated remotely over the communications network solves many additional problems related to installing and supporting systems at the contractor site for product testing. The various embodiments of the method of the invention thereby offer a greatly improved method for building a product data tracking history.

The above brief description sets forth rather broadly the more important features of the present disclosure so that the detailed description that follows may be better understood, and so that the present contributions to the art may be better appreciated. There are, of course, additional features of the disclosure that will be described hereinafter which will further describe the subject matter of the invention. In this respect, before explaining an embodiment of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
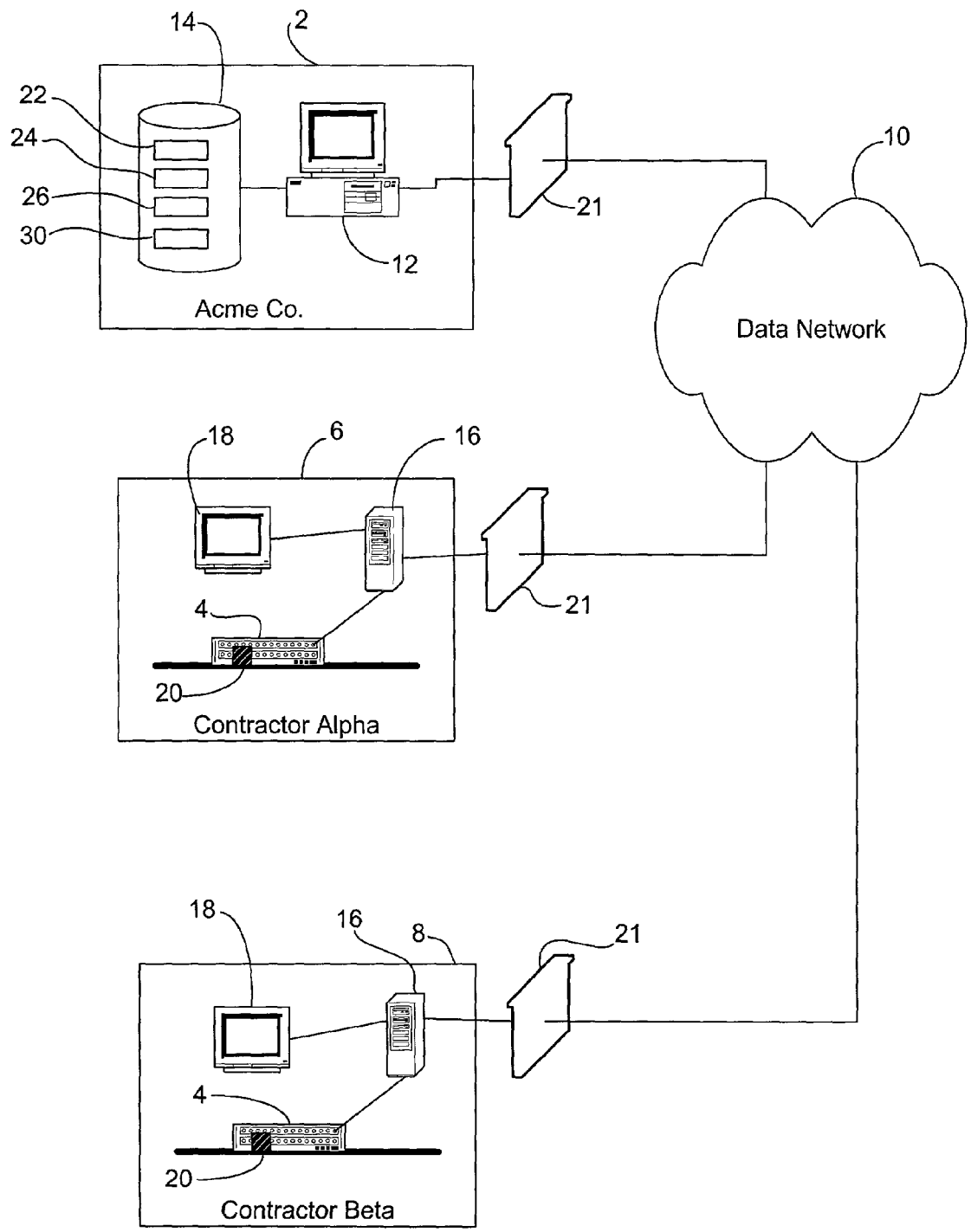
FIG. 1 is a schematic of a product owner and external manufacturing contractors useful in describing practice of an embodiment of the method of the invention.

The schematic of FIG. 1 will be helpful in describing a preferred embodiment of the method of building a product data tracking history of the invention. As discussed above, it has been discovered that the method of the present invention is of particular utility for the manufacture of technically sophisticated products, such as computer peripherals. Accordingly, a preferred embodiment will be described in reference to the hypothetical production of a computer printer by Acme Co. 2 as shown in FIG. 1. The schematic of FIG. 1 illustrates a contract manufacturing situation, where Acme 2 has contracted out the manufacture of a printer 4 to Contractor Alpha 6. It may be assumed that a plurality of component parts have been obtained and shipped to Alpha 6, where they will be assembled to create the final printer 4. Thus, Alpha 6 represents the final assembly "link" in the supply chain for manufacturing the printer 4. Contractor Beta 8 has also been contracted with for partial product manufacture; in particular Beta 8 will perform defect resolution tasks should a product defect be detected.

This preferred embodiment of the method of the invention will use a communications network 10. "Communications network" as used herein is intended to refer to a means for achieving communication between entities, and may include by way of example and not limitation, wide area data networks, local area data networks, virtual private data networks, a telephone network, wireless networks, and the World Wide Web or Internet. Because of its relative low cost and relative wide availability, the Internet is a preferred communications network for the practice of this embodiment of the invention method.

A central computer device 12 is under Acme 2 control. As used herein, the term "under control" is intended to refer to a general condition of being operably accessible and securable. That is, a computer device may be considered to be "under the control" of an entity if that entity may generally direct its operation and may exclude others from using the computer device. Thus, for instance, a computer device would be under the control of Acme it is in Acme's facility and run by Acme's employees, if it is at a computer operator facility that is contractually obligated to Acme to operate the computer as Acme may direct, or the like.

Computer device 12 may comprise, by way of example and not limitation, a processor based server device such as a personal computer, workstation, or mainframe computer. The term "computer" and "computer device" are thus intended herein to be read in their broadest light, and generally are intended to refer to any machine capable of processing instructions. Preferably, a central data repository 14 is further provided and is connected to the central computer device 12. The data repository 14 may comprise a storage medium located in the central computer device 12, or may comprise a remote storage medium such as an external disk drive, or even a storage medium such as a disk drive residing in a second computer device. The central computer device 12 is connected to the network 10.

As used herein, to "connect" an entity to the communications network is intended to only refer to operably enabling communications between the network and the entity. No particular physical steps are required. In the schematic of FIG. 1, data connections are illustrated with lines, which as will be appreciated may represent phone lines, copper or fiber data lines, wireless connections, or other means of data transfer.

The method of the invention may further comprise connecting contractors Alpha 6 and Beta 8 to the network 10. Preferably, at least one operator computer device 16 is provided at each contractor Alpha 6 and Beta 8, with the operator computer device 16 of each respective contractor being connected to the network 10. The operator computer device 16 is a processor based machine, and may comprise by way of example a server device, a personal computer, a workstation, or other processor based machine. The operator device 16 is used to facilitate at least a portion of the manufacture of printer 4. Operator computer device 16 will facilitate connection to the printer 4 when it is present at the particular contractor. In this manner, the printer 4 may be connected to data the network 10 for communication with Acme 2. At least one monitor 18 is preferably also provided at each of the contractors Alpha 6 and Beta 8 connected to the operator computer device 16.

It will be appreciated that a plurality of operator computer devices 16 and monitors 18 may be comprised at Alpha 6 and Beta 8. These computer devices 16 and monitors 18 may be networked together in a LAN or WAN arrangement within one or more of the contractors. Further, it will be appreciated that the preferred output device comprising monitor 18 may further comprise means for inputting data, such as virtual screen buttons or the like that may be used by an operator to input data.

Each of the plurality of contractors Alpha 6 and Beta 8 can communicate with the central computer device 12 and the data repository 14 over the network 10. Likewise, the printer 4 may communicate with the central computer device 12 and the data repository 14 over the network 10 when connected to the operator computer device 16 at any of the contractors 6 or 8.

The method of the invention further comprises the step of assigning a unique product identity code to the printer 4. For purposes of example, the printer 4 is assigned a code of "AZ467". The code is preferably assigned to the printer 4 by physically recording the product identity code on the printer 4 in a computer readable format. It is noted that FIG. 1 as illustrated shows a printer 4 at each of contractor Alpha 6 and Beta 8. It will be appreciated that this is for purposes of illustration only, since in practice there is only one unique printer 4 with identity code AZ467.

Each of Acme 2, Alpha 6, and Beta 8 have a firewall 21 placed between them and the network 10. It will be appreciated that such a configuration is advantageous for security reasons, particularly when the communications network 10 is widely available to other users, as of course is the case when the network 10 comprises the internet. As will be appreciated by those knowledgeable in the art, the firewall 21 may take the form of various devices or applications, and as used herein is intended to refer broadly to a security application designed to selectively allow communication therethrough.

The preferred embodiment of the method of the invention further comprises the step of assigning a unique contractor code to each of the plurality of contractors. For purposes of example herein, the contractors 6 and 8 of FIG. 1 have been assigned codes of "Alpha", and "Beta", respectively. It will be appreciated that a wide variety of unique coding schemes for both contractors and products can of course be comprised, the method of the invention only requires that the codes be unique in that each contractor and each individual product can be identified.

An additional step of the method of the invention is to install a diagnostic tool on the printer 4. "Diagnostic tool" as used herein is intended to refer to a tool that may be operated to provide data regarding the product condition. Preferably, the diagnostic tool comprises at least a set of recorded processor executable instructions. A preferred example of a diagnostic tool comprises a chip with computer executable instructions stored in flash memory thereon for performing desired steps when queued. Other examples may comprise computer executable instructions recorded on other mediums. Thus, a diagnostic tool may comprise recorded instructions on a magnetic or optical storage medium. For purposes of illustration only, a diagnostic tool has been illustrated as a black box 20 shown in the printer 4, which may be considered to be a chip. Preferably, the diagnostic tool 20 has recorded computer executable instructions thereon for providing the printer's unique identity code, at least a partial inventory of components installed on the printer 4, and for performing certain performance tests.

In an additional step of the preferred embodiment of the method of the invention, at least a set of product assembly specifications is placed in the central data repository 14. The term "a set of product assembly specifications" as used herein is intended to refer to specifications regarding the construction, design, or assembly of a product. For purposes of illustration, sets of assembly specifications have been illustrated in FIG. 1 by file 22 in the central repository 14. Each component to be installed may require an individual set of assembly specifications 22. Alternatively, a single set of assembly specifications 22 may provide instruction for multiple components to be installed by a single or several contractors. For purposes of example and convenience, it is put forth that a plurality of individual sets of assembly specifications as will be required for assembly of the printer 4 are present in the single file 22 of FIG. 1. Each individual set of assembly specifications are additionally provided with a unique identity code.

Under circumstances of contract manufacturing, product performance tests will often be required of the contract assembler. In the case of Alpha's 6 assembly of the printer 4, for example, Acme 2 may require Alpha to conduct a performance test after each component has been installed to insure that it is properly installed and interfacing with other components properly. Accordingly, a further step of the preferred embodiment of the method of the invention is to place a set of performance test protocols on the central data repository 14. "Product performance test protocols", as used herein, are intended to refer broadly to instructions for testing the performance of a product component. Preferably, the instructions are computer readable and are executable by diagnostic tool 20.

For purposes of illustration, a product performance test protocol has been illustrated as the file 24 in the data repository 14 of FIG. 1. The performance test protocol file 24 may be considered to contain a plurality of individual recorded performance test protocols, each of which is assigned a unique identity code in an additional step of the preferred embodiment of the method of the invention.

Through still additional steps of the method of the invention, diagnostic tool 20 will be remotely operated from the central computer device 12 to provide various product tracking data during the manufacture of the product 4 when connected to the network 10. The diagnostic tool 20 will also be remotely operated to execute performance tests, and to report results over the network 10. These capabilities represent important advantages of the method of the invention over methods of the prior art. Generally, such a configuration advantageously removes dependence on the supply chain contractors Alpha 6 and Beta 8 to accurately transfer product-tracking data to Acme 2. Additionally, the burden of installing, operating, and maintaining systems to obtain this data is removed from contractors Alpha 6 and Beta 8.

In the preferred embodiment of the method of the invention, when the printer 4 is connected to the communications network 10 while at Alpha 6 or Beta 8, three general types of data exchanges occur over the network 10 with Acme 2: 1) the sets of assembly specifications 22 are transmitted from the central repository 14 for the manufacture of the printer 4; 2) certain printer 4 diagnostic data is obtained through remote operation of the tool 20 and transferred to the data repository 14; and 3) the performance test protocols 24 are transmitted from the repository 14 for execution by the diagnostic tool 20 with test results then transferred directly back from the diagnostic tool 20 to the repository 14. A comprehensive product data tracking history can then be assembled by the central computer device 12 using these three general types of data.

To further illustrate the preferred embodiment of the method of the invention, a product-tracking data history will be assembled for the printer 4 of FIG. 1 with unique product identity code AZ467. The sample product tracking data history that results from practice of this embodiment of the method of the invention is illustrated in Table 1. It will be appreciated that this product tracking data history is presented for illustration only, and is not intended to express any limitations regarding product data tracking histories built through the method of the invention as claimed, which may contain more or less data than that illustrated and which may be in different formats. The steps of the method taken to build this history will be discussed in detail below.

TABLE 1

Example Product Tracking History
Product Tracking Data History for Product Code: AZ467

| | | Components: | | | Product Performance Tests: | |
|---|---|---|---|---|---|---|
| Contractor: | Dates Printer at Contractor: | Components installed at Contractor: | Date Installed: | Assembly Specifications Used at Contractor to install Component: | Performance Test Protocol with Results for Tests at Contractor: | Date Test Run at Contractor: |
| Alpha | Sep. 3, 2000– Oct. 11, 2000 | Board 11 | 9/4 | Board Rev. 1 | Board Test Rev. 2: PASS | 9/4 |
| | | Motor 14C | 9/4 | Motor Rev. 1 | Motor Test Rev. 1: PASS | 9/4 |
| | | Bus | 9/6 | Bus Rev. 2 | Bus Test Rev. 1: PASS | 9/6 |
| | | LCD Screen JX3 | 9/20 | Screen Rev. 1(b) | Screen Test Rev. 1(b): PASS | 9/21 |
| | | Printer Drive Head Z | 10/3 | PH Rev. 3 | PH Rev. 2: PASS | 10/4 |
| | | Disk Drive SD3 | 10/5 | Disk Drive Rev. 1 | Disk Drive Rev. 2: FAIL | 10/5 |
| Beta | Oct. 19, 2000– Oct. 26, 2000 | Disk Drive SD3 | 10/25 | Disk Drive Rev. 1 | Disk Drive Rev. 2: PASS | 10/25 |
| | | | | | Board Test Rev. 2: PASS | 10/25 |

In order to better illustrate the preferred embodiment of the method of the invention, the steps of the method will be discussed in detail from the point at which the printer 4 with diagnostic tool 20 installed thereon is connected to the operator computer device 16 at Alpha 2 of FIG. 1. It will be appreciated that by the time this occurs, a number of component parts have been obtained, gathered together, and delivered to an operator for assembly.

Figure 2A:
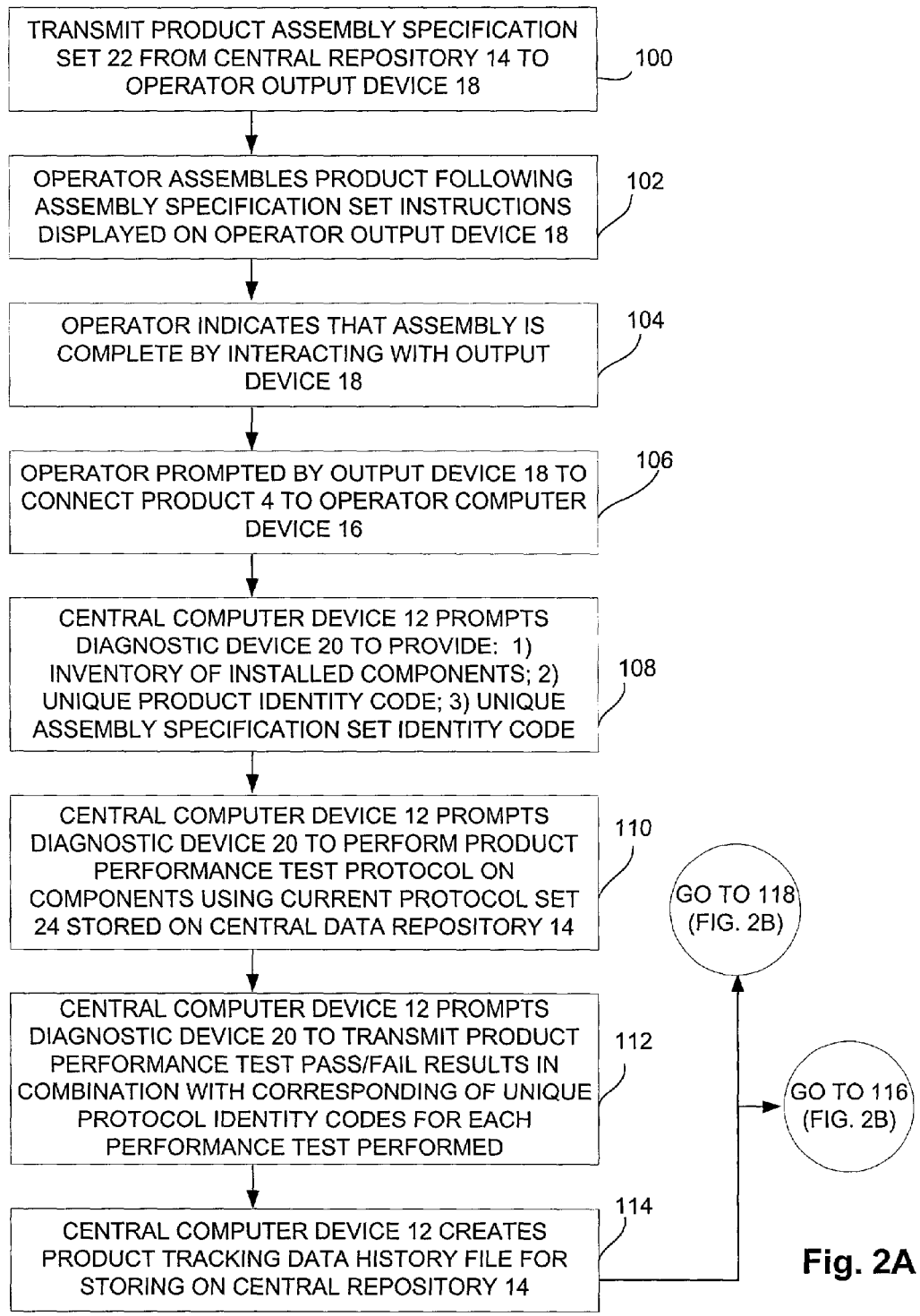
FIGS. 2A–2B is a flowchart illustrating a set of steps of an embodiment of the method of the invention.
Figure 2B:
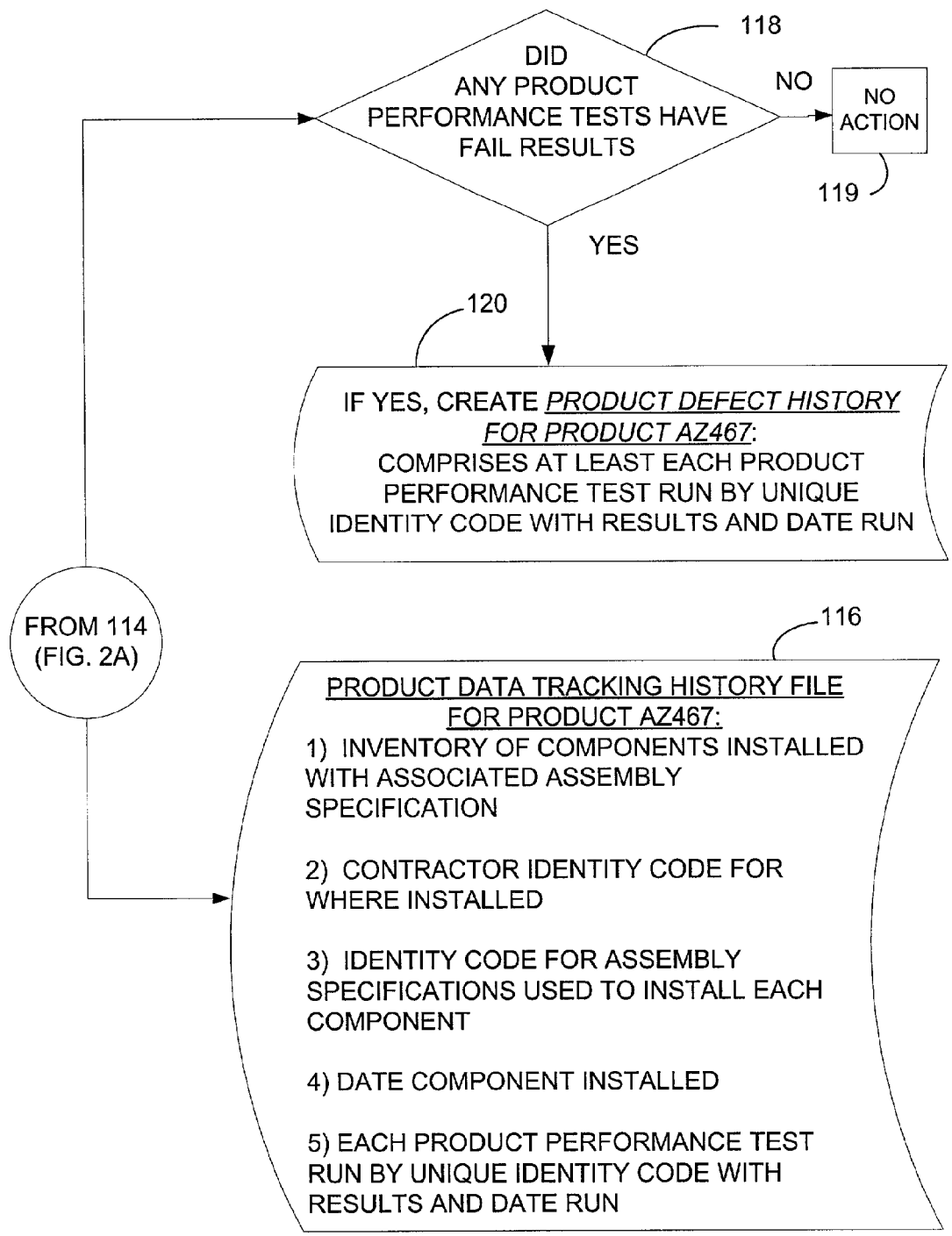

Reference is now drawn simultaneously to FIG. 1 as well as FIGS. 2A–2B, which are a flow chart illustrating the preferred set of method steps that occur once the operator at Alpha 2 has been delivered all component parts for the printer 4 and is ready to begin assembly. At this point (100), a set of product assembly specifications 22 are transmitted over the network 10 for output on the Alpha operator output device 18. Preferably, as illustrated, the output device 18 comprises a monitor on which the operator will view assembly specifications on a step by step basis. Other output devices may comprise printers or other devices.

The Alpha operator then assembles the printer 4 following the assembly specifications 22 (102). Assembly specifications may comprise descriptions of parts to be installed, as well as instructions for installation. They may be presented in a step-by-step manner, with the operator required to interact with the output device 18, such as, by way of example, clicking a mouse button or striking a "virtual" button on the output device 18 after each step to begin the next step. Additionally, assembly may occur on an assembly line between a number of different operators. In this case the method of the invention will comprise providing a plurality of the output devices 18, with one for each operator station.

Importantly, through the method of the invention the actual file 22 containing these assembly specifications remains under Acme's control on the central data repository 14. This allows Acme to retain tight and accurate control over the assembly specifications actually being used during product manufacture by the various contractors. Any changes to assembly specifications that need to be made can be easily accomplished without requiring any actions on the part of the contractors. The method of the invention thereby completely removes any uncertainty as to which version of assembly specifications are being used by the contractor. Further, burdens on contractors such as Alpha associated with installing, maintaining, and updating assembly specifications are eliminated.

The preferred embodiment of the invention further comprises storing previous versions of assembly specifications in the central data repository 14 as newer versions are installed. This advantageously creates an archive for future reference that can be widely accessed over the network 10.

As indicated by the sample product data tracking history of Table 1, the printer 4 is assembled using individual assembly specification sets for a board, a motor, a bus, an LCD screen, a printer drive head, and a disk drive. Again referring to FIGS. 1 and 2, the operator prompts the output device 18 that assembly of the printer 4 is completed (104). The operator is then prompted to connect product 4 to the operator computer device 16 (106). Connection may occur, by way of example, by the operator connecting a pin connector on a cable to a serial port connection, or by initiating a wireless connection with the product 4. Other modes of connection are of course within the scope of the invention as will be appreciated by those knowledgeable in the art.

The diagnostic tool 20 is then remotely operated over the network 10 from the central computer device 12 (108) to provide product specification data (110). As indicated, this specification data preferably comprises at least the product unique identity code AZ467, an inventory of installed components, and a list of assembly specification set identity codes used to install the various components in the product. Table 1 indicates that installed components are identified by a model number. It is within the scope of the invention to also identify installed components by serial number or other identifying data.

It is also noted that not all components need be listed. Indeed, the preferred embodiment of the method of the invention will provide an inventory only of relatively "high touch" electronic components that are important to the product operation. Things such as housings and simple mechanical parts without electronic interface may not be practical to inventory or test with the diagnostic tool 20.

It is further noted that the scope of the invention as claimed is not limited to this specification data being provided only from the diagnostic tool 20, but may for example also be obtained by combining some data provided by the tool 20 with data obtained by the central computer device 12. For instance, after learning the identity code of product 4 and inventory of installed components from the tool 20, the central computer 12 may query the data repository 14 to obtain identity codes for the current assembly specifications corresponding to the installed components.

Product performance testing of product 4 may then be initiated (110). This involves transmission of product performance test protocols in file 24 over the network 10 for execution by diagnostic tool 20. As indicated by the sample product tracking data history of Table 1, performance test protocols may be run on each individual component. Preferably, the performance test protocols when executed by diagnostic tool 20 will at least indicate whether the component being tested is interfacing properly with other components. Test protocols preferably have a PASS/FAIL outcome. In addition to having an individual performance test protocol for each component, performance test protocols may be executed that measure performance of a plurality of components in a single test. A test protocol may even be executed for measuring the overall product performance.

The method of the invention thereby achieves several advantageous results in product performance testing over methods of the prior art. Because test protocols are retained under the product owner's control, any uncertainty as to which test protocol is being run has been removed, and any changes that need to be made in terms of installing new revisions of test protocols can be very quickly accomplished. Further, remote operation of the diagnostic tool 20 from the central computer device 12 to execute performance test protocols removes the burden of installing, maintaining, and performing tests from contractors such as Alpha.

Product performance test protocols may provide an interface screen on the central computer device 12 for an Acme operator to participate in executing the test. As an example, an interface screen may display test results dynamically, with the Acme operator able to remotely direct the diagnostic tool 20 to take any of several actions as may be desired depending on the dynamically displayed test results. By way of additional example, execution of test protocols may request other operator interaction. With reference to Table 1, the LCD screen installed on the printer 4 is to be performance tested under test protocol Screen Test Rev. 1(b). This test protocol may direct the diagnostic tool 20 to test a connection between the main board and the screen, and then to test the screen operation by displaying certain characters on the screen. The test protocol may further direct that the operator is to interact with the operator output device 18 by clicking a mouse, pressing a virtual screen button, or in some other manner to confirm that the characters are displayed on the screen. Other test protocols by way of example may direct the Alpha operator to turn printer switches on and off or to take other actions on the printer.

The central computer 12 directs the diagnostic tool 20 to transmit PASS/FAIL results for performance testing to the central computer device 12, along with the test identity code for the test protocol executed (112). In addition to PASS/FAIL results, performance tests may have other outcomes indicative of component performance such as numerical values. It will also be appreciated that PASS/FAIL results may comprise numerical values, as for instance if a value below a certain numerical limit is assigned a FAIL result.

As discussed herein above, during a product lifetime it is likely that the product will change. As these changes occur it is likely that performance testing protocols will likewise change. It is an important advantage of the method of the invention that the product tracking data history being built includes a record of which test protocol was run; hence the test identity code is recorded. It is likewise an important advantage of the method of the invention that new protocols may be easily installed on the central repository 14. This eliminates any uncertainty as to which test protocol is being run by the contractor, and also eliminates burdens associated with installing and training contractors such as Alpha operators to run the tests. Additionally, the preferred embodiment of the invention further comprises storing previous test protocol versions on the central repository 14 for future reference.

It is noted that although FIG. 2A indicates that the diagnostic tool will transmit the test identity code (112), this information may likewise be determined by the central computer device 12 within the scope of the present invention. By way of example, the diagnostic tool 20 may be prompted to transmit performance test results, with the central computer 12 then querying the central repository 14 for the current test identity codes corresponding to the test protocols being executed.

The product tracking data history is finally built (114), and is summarized in FIG. 2B (116). Generally, a preferred product tracking data history as summarized in FIG. 2B (116) is representative of the sample product tracking data history of Table 1. The unique printer identity code AZ467 is first associated with the tracking data history; in this manner there will be one individual tracking history for each individual product. Product specification data as well as performance test results are then placed in the file. As indicated this data generally comprises an inventory of components installed, assembly specifications used to install the components, dates installed, performance test results for the components, identity of performance test protocols run, and dates the performance tests were run.

The actual product tracking data history created is preferably in computer readable format, and is placed in the data repository 14 of FIG. 1. The product tracking data history has been indicated as file 26 in FIG. 1. In a most preferred format the file is in a widely readable database or spreadsheet format, with examples including but not limited to Microsoft Excel or Lotus 1-2-3. This advantageously makes it widely available.

FIG. 2B also indicates that a second Product Defect History file may be created if any performance test had a fail result (118). As an example, it is noted from Table 1 that the printer 4 had a FAIL result for "Disk Drive Rev. 2" performance test. This FAIL flag when processed (118) results in creation of a product defect history file (120). If no FAIL results were obtained, no action is taken (119). This product defect history file generally comprises a history of tests run on the components and test results. The product defect history file will be placed on the central repository 14, as indicated by file 30 in FIG. 1.

In practice, when a product is determined to have a defect, it may be directed to a second contractor or group for defect resolution. In the hypothetical printer manufacture process as presented by FIG. 1, upon detection of the disk drive failure, the printer 4 is sent to defect resolution contractor Beta 8 for repair. Once at Beta 8, the printer 4 is connected to the Beta operator device 16, which in turn allows the printer 4 to communicate with the central computer device 12 over the network 10. After transmitting the printer 4 unique identity code AZ467 to the central computer device 12, the Beta operator may obtain access to both the product defect history file 30 and the product tracking data file 26 for output on the operator output monitor 18.

With this valuable information the Beta operator may attend to quickly resolving the disk drive defect in the printer 4. The Beta operator is not required to obtain paper histories of the printer 4 manufacture or testing from Alpha 6 or Acme 2, or to have personal interface with Alpha 6 or Acme 2 as was required for methods of the prior art. This greatly speeds and reduces the cost of the defect resolution process.

Any changes made to the printer 4 by Beta 8 in resolving the defect may further be recorded remotely over the communications network 10 in the product data tracking history 26 and in the product defect history file 30. Additionally, at the completion of defect resolution at Beta 8, performance testing of the disk drive as well as additional components as may be required using the performance test protocol set 24, with results also recorded in the product tracking data history, as indicated in the sample product tracking data history of Table 1.

It will be appreciated that many variations on the preferred embodiment of the method of the invention as described herein are within the scope of the claims appended hereto. As an example, additional contractors may be comprised in addition to those illustrated in FIG. 1 and discussed herein. A second assembly contractor, in addition to Alpha 6, for instance, could be used to install an additional group of components on the printer 4.

Further, it will be appreciated that the method of the invention is not limited to a contract manufacture situation, but likewise may be applied to purely internal manufacture. In this sense it would be applicable to describe the product owner Acme in FIG. 1 to comprise a design group, and contractor Alpha to comprise an Acme manufacturing group that may be located in the same location as the product owner group and that is connected to the product owner group via a LAN. The assembly group could of course likewise be remotely located.

It will further be appreciated that the group of method steps as described in the flow chart of FIGS. 2A–2B should not be considered to limit the sequence of steps described therein. It will be apparent that the steps described could be carried out in a different sequence to accomplish the same result. For example, nodes 108 and 110 could easily be reversed in sequence without changing any method results. As an additional example, the printer 4 could be connected to an operator computer device 16 at an earlier step in the flow chart so that the printer 4 is "on-line" throughout assembly.

Additionally, it will be appreciated that the method of the invention as claimed will be equally applicable to automated manufacturing that does not require human operators. As an example, the operator computer device 16 at Alpha 6 could comprise or control a robotic device that assembles the printer 4. Further, sets of assembly specifications could comprise executable instruction for the robotic devices.

It will further be appreciated that the method of the invention is well suited to performance by a computer, and may in fact comprise the steps of the invention as described herein in the form of a set of computer instructions contained in a computer accessible medium such as a magnetic or optical storage media for causing a computer to perform the various steps of the method of the invention.

In particular, the present invention may comprise a computer program product for causing the central computer 12 of FIG. 1 to create a product tracking data history file for printer 4 by executing instructions that cause the central computer 12 to interface with the diagnostic tool 20 and with operator device 16 over the data network 10 to perform the various steps of the method of the invention as described herein.

The various steps of the method of the invention as detailed herein with reference to a preferred embodiment thereby provide a novel and efficient method for building a comprehensive product tracking data history for a product as it is manufactured by a plurality of contractors. As summarized in the hypothetical product tracking history of Table 1, the history provides a detailed history of what was installed in the product by whom, when it was installed, and under what specifications. Additionally, a history of what protocols were used to test each component, when it was conducted, and what results were obtained is likewise recorded. Importantly, this comprehensive product tracking data history is able to be built through the novel method of the invention with much greater accuracy and with much less cost and effort than was possible using methods of the prior art.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

Various features of the invention are set forth in the appended claims.

What is claimed is:

1. A method for building a product data tracking history of the manufacture of a product of the type which has a processing means, said method utilizing a central computer device operably connected to a communications network, comprising the steps of:
   installing a diagnostic tool on the product, said tool being of the type which is capable of providing specification data about the product;
   assigning a unique product identity code to the product;
   connecting the product to the communications network;
   remotely operating said diagnostic tool over the communications network from the central computer device to provide said product specification data to the central computer device, said product specification data comprising at least said unique product identity code; and,
   building the product tracking data history using said product specification data with the central computer device.

2. The method as defined in claim 1 wherein said diagnostic tool comprises at least computer executable instructions recorded on a computer accessible medium.

3. The method for building a product tracking data history as defined in claim 2 wherein said computer executable instructions comprise at least instructions for determining an inventory of installed components on the product, for storing and reporting said unique product identity code, and wherein said product specification data further comprises an inventory of components installed on the product.

4. The method for building a product tracking data history as defined in claim 1 wherein said step of building the product tracking data history using said product specification data further comprises assigning said unique product identity code to the product tracking data history.

5. The method for building a product tracking data history as defined in claim 1 wherein an operator computer device that at least partially controls the manufacture of the product is connected to the communications network, the method further comprising the steps of:
   placing at least one set of product assembly specifications in a central data depository connected to the central computer device;
   assigning a unique identity code to each of said set of product assembly specifications;
   transmitting said product assembly specifications to the operator computer device for use in assembling the product; and,
   wherein said product specification data further comprises said unique identity code corresponding to said product assembly specifications being transmitted to the operator computer device.

6. The method for building a product tracking data history as defined in claim 1 wherein the method further comprises the steps of:
   providing at least one product performance test protocol;
   placing said at least one product performance test protocol in a central data repository connected to said central computer device;
   wherein said step of remotely operating said diagnostic tool over the communications network further comprises causing said diagnostic tool to execute said at least one product performance test protocol, and wherein said product specification data reported by said diagnostic tool further comprises product performance test results.

7. The method for building a product tracking data history as defined in claim 6 wherein said method further comprises the step of:
   assigning a unique test identity code to each of said at least a product performance test protocol; and,
   wherein said product specification data reported by said diagnostic tool further comprises said unique test identity code corresponding to said performance test protocol.

8. The method for building a product tracking data history as defined in claim 7 wherein each of said at least a product performance test protocol has a pass or fail outcome, and wherein the method further comprises the step of:
   creating a product defect file in said central data repository when a fail result occurs upon execution of said at least a product performance test protocol.

9. The method for building a product data tracking history as defined in claim 8 wherein said product defect file comprises at least said test identity code for said product performance test protocol resulting in said fail result.

10. The method for building a product tracking data history as defined in claim 1 wherein the method is for manufacturing a product for a product owner by at least an external contractor, the at least an external contractor connected to the communications network, and wherein the central computer device connected to said network is under control of the product owner, wherein the method further comprises the step of:

connecting the product to the communications network while the product is at the external contractor; and, wherein said step of remotely operating said diagnostic tool over the communications network comprises remotely operating said diagnostic tool while the product is at the at least an external contractor.

11. The method for building a product tracking data history as defined in claim 10 wherein the method further comprises the step of:

assigning each of the at least an external contractor a unique contractor code, and wherein said product specification data further comprises said unique contractor code.

12. The method for building a product tracking history as defined in claim 11 wherein the at least an external contractor comprises a plurality of external contractors.

13. A method for building a product tracking data history for a product manufactured for a product owner by at least an external contractor, a communications network connecting the product owner with each of the at least an external contractors, a central computer device controlled by the product owner connected to the communications network, the method comprising the steps of:

installing a diagnostic tool on the product, said diagnostic tool being of the type which is capable of reporting specification data about the product;

assigning a unique product identity code to the product;

connecting the product to the communications network when the product is at the at least an external contractor;

remotely operating said diagnostic tool over the communications network with the central computer device to report product specification data to a central data repository connected to the central computer device, said product specification data comprising at least said unique product identity code; and, building the product tracking data history from said central data depository using said product specification data.

14. The method as defined in claim 13 wherein said diagnostic tool comprises at least computer executable instructions recorded on a computer accessible medium.

15. The method for building a product tracking data history as defined in claim 14 wherein said diagnostic tool recorded computer executable instructions comprise at least instructions for determining an inventory of installed components on the product, means for storing said unique product identity code, and wherein said product specification data further comprises an inventory of components installed on the product.

16. The method for building a product tracking data history as defined in claim 13 wherein said step of building the product tracking data history from said central data depository using said product specification data further comprises assigning said unique product identity code to the product tracking data history.

17. The method for building a product tracking data history as defined in claim 13, wherein the method further comprises the step of:

placing at least a set of product assembly specifications in said central data repository whereby the at least an external contractor may access said at least a set of product assembly specifications remotely over the communications network to build the product.

18. The method for building a product tracking data history as defined in claim 17 wherein the at least an external contractor has an operator computer device connected to the communications network, and wherein the method further comprises the steps of:

assigning a unique product assembly specification code to each of said at least a set of product assembly specifications;

transmitting said at least a set of product assembly specifications over the communications network to the operator computer device; and wherein said product specification data remotely reported over the communications network from said diagnostic tool further comprises said unique product assembly specification code corresponding to said at least a set of product assembly specifications transmitted to the operator computer device.

19. The method for building a product tracking data history as defined in claim 13 wherein the method further comprises the steps of:

providing at least a product performance test protocol for testing the performance of the product; and, placing said at least a product performance test protocol in said central data repository whereby said at least a product performance test protocol may be transmitted over the communications network to the at least an external contractor.

20. The method for building a product tracking data history as defined in claim 19 wherein said step of remotely operating said diagnostic tool over the communications network further comprises causing said diagnostic tool to execute said product performance test protocol, and wherein said product specification data reported by said diagnostic tool further comprises results from execution of said product performance test protocol.

21. The method for building a product tracking data history as defined in claim 20 wherein the method further comprises the step of assigning a unique test identity code to each of said at least a product performance protocol, and wherein said product specification data reported by said diagnostic tool further comprises said unique test identity code corresponding to said performance test protocol.

22. The method for building a product tracking data history as defined in claim 21 wherein each of said at least a product performance test protocol has a pass or fail outcome, and wherein the method further comprises the step of creating a product defect history file in said central data repository upon occurrence of said fail result.

23. The method for building a product tracking history as defined in claim 22 wherein said product defect history comprises at least said product performance test identity code corresponding to said product performance test resulting in said fail outcome.

24. The method for building a product tracking history as defined in claim 13 wherein the at least a contractor comprises a plurality of contractors; each of the plurality of contractors connected to the communications network whereby each of the external contractors may interface with said central data repository, and wherein the method further comprises the step of:

assigning each of the plurality of external contractors a unique contractor code;

wherein said step of remotely operating said diagnostic tool over the communications network further comprises connecting the product to the communications network when the product is at each of the plurality of contractors;

prompting said diagnostic tool to provide said unique contractor code corresponding to the contractor where the product is; and, wherein said product specification data reported over the communications network to said central data repository further said unique contractor code.

25. The method for building a product tracking data history for a product being manufactured for a product owner by at least an external contractor, the product owner and at least an external contractor connected to a communications network, the product owner controlling a central computer device connected to the communications network, each of the at least an external contractors having an operator computer device connected to the communications network for use in at least a portion of the product manufacture, the method comprising the steps of:

installing a diagnostic tool on the product; said diagnostic tool being of the type which is capable of providing specification data about the product; said diagnostic tool comprising at least computer executable instructions;

assigning a unique product identity code to the product, said unique product identity code accessible by said diagnostic tool;

assigning a unique contractor code to each of the at least an external contractor;

providing at least a set of product assembly specifications;

assigning each of said at least a set of product assembly specifications a unique identity code;

placing said at least a set of product assembly specifications on the central computer device;

providing at least a product performance test protocol; assigning each of said at least a product performance test protocol a unique test identity code, each of said at least a product performance test protocol having a pass or fail outcome;

placing said at least a product performance test protocol on the central computer device;

connecting the product to the communications network when the product is at the at least an external contractor;

transmitting said at least a set of product assembly specifications over the communications network to the operator computer device at the external contractor when the product is connected to said communications device;

remotely operating said diagnostic tool over the communications network to report product specification data to the central computer device, said product specification data comprising at least said unique product identity code, an inventory of components installed on the product, said unique product assembly code corresponding to said at least a set of product assembly specifications transmitted over the communications network, said unique contractor identity code corresponding to the external contractor said set of product assembly specifications are transmitted;

remotely operating said diagnostic tool to execute said at least a performance test protocol to produce performance test results, remotely prompting said diagnostic tool to report said performance test results over the communications network to the central computer device;

building the product data history with the central computer device;

assigning said unique product identity code to the product data history, the product data history comprising at least, said inventory of components installed on the product, said unique contractor code corresponding to the contractor the product is, said product assembly specifications identity code corresponding to said at least a set of product assembly specifications being transmitted over the communications network to the operator computer device, said performance test identity code for each of said at least a performance test protocol executed by said diagnostic tool with corresponding of said performance test results; and, creating a product defect tracking history with the central computer device upon a fail result after execution of any of said at least a product performance test protocols, said product defect history comprising at least said test identity code for said at least a product performance test protocol resulting in said fail result.

26. The method for creating a product tracking data history file as defined in claim 25 wherein the at least an external contractor comprises a plurality of external contractors.

27. A computer program product for causing a computer to create a product tracking data history file for a product, the product comprising processor means and having a unique product identity code, the product having a diagnostic tool installed therein, the diagnostic tool of the type capable of reporting product specification data, the computer program product comprising a computer usable medium having computer readable program code embodied in the medium, the computer usable medium on a central computer that is connected to a communications network, the computer program product when executed causing the central computer to:

remotely operate said diagnostic tool over the communications network when the product is connected to the communications network to report product specification data to a central data repository connected to the central computer device, said product specification data comprising at least said unique product identity code; and, build the product tracking data history from said central data depository using said product specification data.

28. The computer program product as defined in claim 27, wherein at least one set of product assembly specifications are stored in said central data depository connected to the central computer device, the product assembly specifications having a unique identity code, and wherein the computer program product when executed causes the central computer to:

transmit said set of product assembly specifications to an operator computer device connected to the communications network, the operator computer device for use in at least a portion of the manufacture of the product; and, wherein said product specification data reported by said diagnostic tool further comprises said unique identity code corresponding to said product assembly specifications being transmitted to the operator computer device.

29. The computer program product as defined in claim 27, wherein at least one product performance test protocol is stored in said central data depository connected to the central computer device, each of said at least a performance test protocols having a unique test identity code, and wherein the computer program product when executed causes the central computer to:

remotely operate said diagnostic tool over the communications network to execute said at least a product performance test protocol; and, wherein said product specification data reported by said diagnostic tool further comprises product performance test results and said unique test identity code corresponding to said at least a product performance test protocol being executed.

30. A computer program product for causing a computer to create a product tracking data history file for a product, the product comprising processor means and having a unique product identity code, the product having a diagnostic tool installed thereon, the diagnostic tool of the type capable of reporting product specification data, the product being manufactured for a product owner by an external contractor, a unique contractor code assigned to the external contractor, the computer program product comprising a computer usable medium having computer readable program code embodied in the medium, the computer usable medium on a central computer that is connected to a communications network, the product connected to the communications network at the external manufacturer, the computer program product when executed causing the central computer to:

transmit a set of product assembly specifications stored on the central computer over the communications network to an operator computer device at the external contractor, the operator computer device for use in at least a portion of the product manufacture, the set of product assembly specifications having a specification identity code;

remotely operate the diagnostic tool over the communications network to execute a product performance test protocol stored on the central computer, said product performance test protocol having a test identity code;

remotely operate the diagnostic tool over the communications network to report product specification data to the central computer device; said product specification data comprising at least the unique product identity code, the unique contractor code, an inventory of components installed on the product, said unique product specification code corresponding to said set of product assembly specifications transmitted over the communications network, performance test results resulting from executing said product performance test protocol, said test identity code corresponding to said product performance test protocol executed;

build the product data history;

assign the unique product identity code to the product data history, the product data history comprising said inventory of components installed on the product, the unique contractor code corresponding to the external contractor the product, said product assembly specifications identity code corresponding to said set of product assembly specifications being transmitted over the communications network to said operator computer device, said test identity code for said performance test protocol executed by said diagnostic tool with corresponding of said performance test results; and, create a product defect tracking history with the central computer device upon a fail result for any of said at least a product performance test protocols, said product defect history comprising at least the unique product identity code and said test identity code for said at least a product performance test protocol resulting in said fail result.

* * * * *